(12) United States Patent
Takahashi et al.

(10) Patent No.: US 8,144,177 B2
(45) Date of Patent: Mar. 27, 2012

(54) IMAGE FORMATION APPARATUS AND IMAGE FORMATION METHOD

(75) Inventors: Katsumi Takahashi, Toride (JP); Tsuyoshi Moriyama, Toride (JP); Atsushi Chaki, Kashiwa (JP); Takahiko Yamaoka, Kashiwa (JP)

(73) Assignee: Canon Kabushiki Kaisha (JP)

( * ) Notice: Subject to any disclaimer, the term of this patent is extended or adjusted under 35 U.S.C. 154(b) by 1302 days.

(21) Appl. No.: 11/290,277

(22) Filed: Nov. 30, 2005

(65) Prior Publication Data

US 2006/0120419 A1    Jun. 8, 2006

(30) Foreign Application Priority Data

Nov. 30, 2004   (JP) ................................ 2004-347240

(51) Int. Cl.
*B41J 2/47* (2006.01)
(52) U.S. Cl. .................... 347/237; 347/240; 347/251
(58) Field of Classification Search .................. 347/237, 347/247, 240, 251
See application file for complete search history.

(56) References Cited

U.S. PATENT DOCUMENTS

| | | | | |
|---|---|---|---|---|
| 5,347,298 A * | 9/1994 | Gokita | ........................... | 347/133 |
| 5,452,073 A * | 9/1995 | Kataoka | ........................ | 399/299 |
| 2002/0113856 A1 * | 8/2002 | Suzuki | ......................... | 347/133 |
| 2004/0136025 A1 * | 7/2004 | Moriyama et al. | ............ | 358/1.14 |
| 2004/0165056 A1 * | 8/2004 | Allen et al. | ..................... | 347/233 |
| 2004/0174428 A1 * | 9/2004 | Seki et al. | ...................... | 347/250 |

FOREIGN PATENT DOCUMENTS

| JP | 2000-221424 A | 8/2000 |
|---|---|---|
| JP | 2002-154236 A | 5/2002 |

OTHER PUBLICATIONS

Office Action Issued in corresponding Japanese Patent Application No. 2004-347240 dated Jul. 10, 2009.

* cited by examiner

*Primary Examiner* — Stephen Meier
*Assistant Examiner* — Sarah Al Hashimi
(74) *Attorney, Agent, or Firm* — Rossi, Kimms & McDowell LLP

(57) ABSTRACT

An image formation apparatus for executing image formation by exposing an image carrier with irradiation light emitted from a laser source on the basis of an input signal to drive the laser source includes a correction amount calculation unit configured to calculate, on the basis of a generated correction pattern, a correction amount to control the ON or OFF timing to drive the laser source, and a signal generation unit configured to generate, on the basis of image data and the correction amount calculated by the correction amount calculation unit, a corrected signal obtained by correcting the input signal to drive the laser source so as to form the image data by controlling the ON or OFF timing.

12 Claims, 15 Drawing Sheets

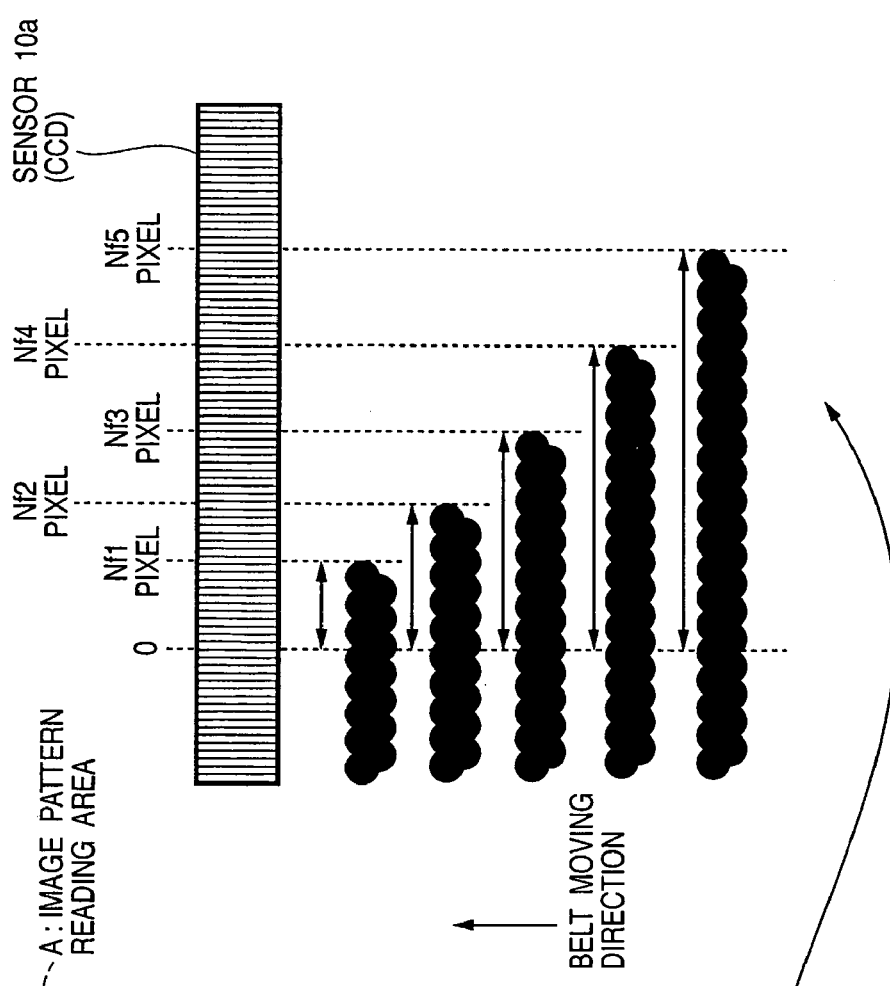
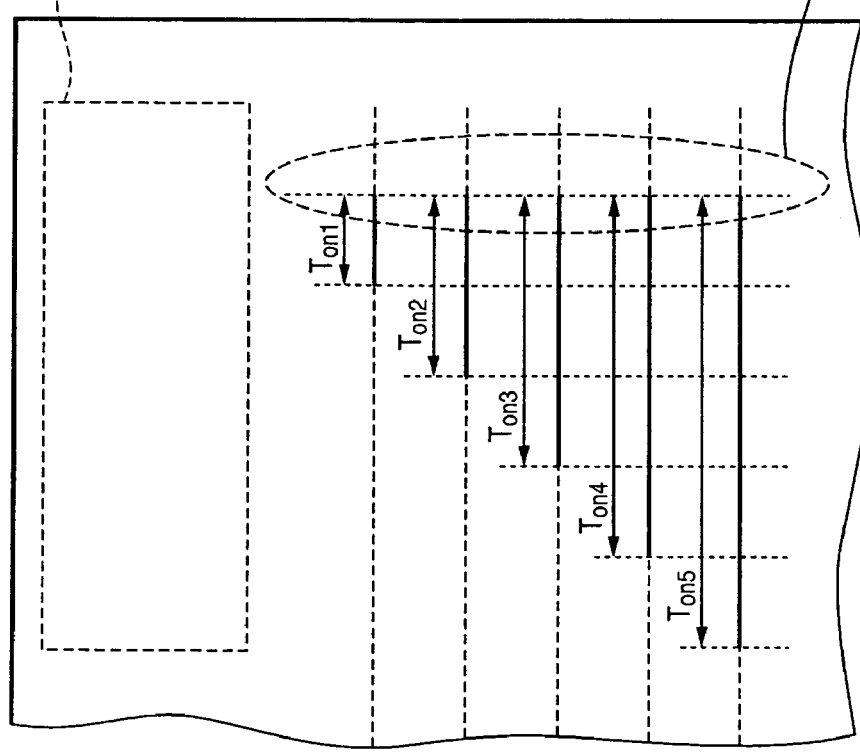
FIG. 10A
FIG. 10B

IMAGE FORMATION APPARATUS AND IMAGE FORMATION METHOD

FIELD OF THE INVENTION

The present invention relates to an electrophotographic image formation apparatus such as a laser beam printer or copying machine, and an image formation method.

BACKGROUND OF THE INVENTION

An electrophotographic image formation apparatus irradiates the surface of an image carrier such as a photosensitive material or electrostatic recording medium with a laser beam emitted from a laser source, thereby forming image information as an electrostatic image on the surface. At this time, the laser beam is controlled to an ON or OFF state on the basis of an ON/OFF signal to drive the laser source on the basis of image data.

The emission time of the laser beam (laser emission time) is preferably always constant for each duration of the ON/OFF signal to drive the laser source. The laser emission time is also preferably always constant for the ON/OFF signal of a single laser. In fact, even when a laser ON/OFF signal of the same time (same timing) is input to the laser source driving circuit, the rise/fall of the current varies due to a variation in rising (time constant) of the current of the circuit (laser source driving circuit) to drive the laser source. Since the response time of laser emission changes because of a variation in laser emission driving threshold or current vs. output light characteristic, the emission time of the laser beam output from the laser source cannot be constant.

Generally, the time (laser ON/OFF time) to ON/OFF-control the laser source to form a 1-dot image shortens as the resolution and velocity of the image formation apparatus increase. In an image formation apparatus with a resolution of, e.g., 600 dpi, the time is about 100 ns. If the resolution doubles to 1,200 dpi without changing the process speed, the laser ON/OFF time must be as short as 25 ns. If the velocity doubles while keeping the resolution at 600 dpi, the laser ON/OFF time shortens to 50 ns.

That is, the variation width of the laser emission time cannot be neglected as the resolution improves, i.e., the laser ON/OFF time per dot shortens. When the image formation apparatus gets higher resolution and velocity, the variation width of the laser emission time becomes nonnegligible. The size of an obtained dot may vary, or no dot can be formed at a desired position.

The relationship between the laser ON/OFF time, the current, and the light beam intensity will be described with reference to FIGS. 3A to 3C. FIG. 3A is a timing chart showing the relationship between the laser ON/OFF signal and the time (ns). FIG. 3B is a timing chart showing the relationship between the time (ns) and the current (mA) (to be also referred to as a "laser current" hereinafter) flowing to the circuit to drive the laser source. FIG. 3C is a timing chart showing the relationship between the time (ns) and the intensity (mW) of a light beam emitted from the laser source by the current shown in FIG. 3B.

When the laser ON/OFF signal is turned on, the laser current gradually increases with a gradient time constant shown in FIG. 3B. When the laser current reaches a threshold current Ith, the laser source starts emitting light, as shown in FIG. 3C.

On the other hand, when the laser ON/OFF signal is turned off (FIG. 3A), the laser current gradually decreases with a gradient time constant shown in FIG. 3B. When the laser current becomes smaller than the threshold current Ith, the laser source stops emission (FIG. 3C). When such a waveform is obtained, a laser emission time TL is defined as the half width (time to ensure the 50% intensity of the light beam) of the time—optical output waveform amplitude, as shown in FIG. 3C.

As shown in FIG. 3B, the laser current has a rise time Tr after the laser ON signal is received until the current reaches Iop and a delay time Tf from Iop to 0. The rise time Tr and delay time Tf are determined by the time constant of the circuit to drive the laser source.

A technique is used to correct the variation in laser emission time due to the rise time Tr and delay time Tf, in which the rise time Tr and delay time Tf are measured in advance during the manufacture of the image formation apparatus or during its adjustment operation before image generation, and the laser ON/OFF signal is corrected by an amount corresponding to the rise time Tr and delay time Tf.

FIGS. 4A to 4D are timing charts showing the correction. FIG. 4A is a timing chart showing the relationship between the time and the laser ON/OFF signal. FIG. 4B is a timing chart showing the relationship between the time and the corrected laser ON/OFF signal. FIG. 4C is a timing chart showing the relationship between the time and the current (mA) flowing to the circuit to drive the laser source turned on by the corrected laser ON/OFF signal. FIG. 4D is a timing chart showing the relationship between the time (ns) and the intensity (mW) of a light beam emitted from the laser source by the current shown in FIG. 4C.

In this example, correction is done to make an ON time Tw (FIG. 4A) of the laser ON/OFF signal equal to the laser emission width TL (FIG. 4D).

First, the rise time Tr is measured. On the basis of the rise time Tr, the laser ON signal shown in FIG. 4A is corrected so that it advances by a time Trcor, as shown in FIG. 4B. Similarly, the delay time Tf is measured in advance. On the basis of the delay time Tf, the laser OFF signal shown in FIG. 4A is corrected so that it advances by a time Tfcor, as shown in FIG. 4B. With this processing, Tw and TL are corrected to the same width.

Another method is also disclosed in which the OFF timing of the ON/OFF signal is delayed by the time Trcor to correct the laser emission delay corresponding to the rise time Tr. Similarly, the ON timing of the ON/OFF signal is delayed by Tfcor to correct the laser OFF delay corresponding to the delay time Tf. With this processing, Tw and TL are corrected to the same width. Still another technique is disclosed in which correction is executed to hold a predetermined relationship between Tr and Trcor and between Tf and Tfcor, thereby making the laser ON/OFF signal and laser emission time have a predetermined relationship.

An example of the above-described prior arts is disclosed in patent reference (Japanese Patent Laid-Open No. 2002-154236).

However, in the above-described prior art, the correction amount of the laser rise time Tr and fall time Tf is always constant independently of image data. Hence, as shown in FIGS. 5A to 5D and FIGS. 6A to 6D, the laser emission time varies due to variations in Tr and Tf.

FIGS. 5A to 5D are timing charts showing variations in rise time of the current flowing to the circuit to drive the laser source at the laser lighting (ON) timing. FIGS. 5A and 5C show the relationship between the time (ns) and the laser ON/OFF signal. FIGS. 5B and 5D are timing charts showing the relationship between the time (ns) and the current flowing to the circuit to drive the laser source by the laser ON/OFF signal.

As shown in FIG. 5A, if a laser OFF time Toff immediately before switching from ON to OFF is long, the laser rise time Tr tends to be long. This occurs due to the influence of charges remaining in the laser driving element. This phenomenon will be described with reference to FIG. 7. Referring to FIG. 7, reference numeral 608 denotes a driving element of the output unit of a laser driving unit 606. Charges 609 in the base unit of the driving element 608 are accumulated by a circuit (not shown) of the preceding stage at the ON timing of the laser source so that a current flows between the base and emitter. Then, the current to drive the laser starts flowing to the output unit (collector) of the driving element 608. If the laser OFF time Toff is long, as shown in. FIG. 5A, the charges 609 decrease to almost zero, and the driving element is charged again from that state. Hence, the time after the driving element 608 is turned on until the current starts flowing to the circuit to drive the laser source, i.e., the rise time Tr becomes long.

On the other hand, if the ON/OFF interval is short, as shown in FIG. 5C, the charges 609 still remain, and the driving element is charged again from that state. Hence, the rise time Tr is shorter than in FIG. 5A (FIG. 5D).

The rise time Tr has been described above. The same phenomenon occurs even for the fall time Tf. FIGS. 6A to 6D are timing charts showing variations in fall time of the current flowing to the circuit to drive the laser source at the laser extinguishing (OFF) timing. FIGS. 6A and 6C show the relationship between the time and the laser ON/OFF signal. FIGS. 6B and 6D are timing charts showing the relationship between the time (ns) and the current flowing to the circuit to drive the laser source by the laser ON/OFF signal.

As shown in FIG. 6A, if an ON time Ton of the laser source before it is turned off is long, the laser current fall time Tf tends to be long. This also occurs due to the influence of charges remaining in the laser driving element 608, as in FIGS. 5A to 5D described above. As the laser ON time Ton becomes long, as shown in FIG. 6A, the residual time of the charges 609 is prolonged, and the time until the laser is turned off (extinguished), i.e., Tf becomes long.

When the ON state time is short, as shown in FIG. 6C, the influence of charges remaining in the driving element 608 is smaller than in the state shown in FIG. 6A. Hence, the time until the laser is turned off (extinguished) is shorter than in FIG. 6A (FIG. 6D).

That is, in the conventional method in which the correction amount of the laser rise time Tr and fall time Tf is always constant independently of image data, the variation in laser emission time, which occurs in accordance with the duration of the state immediately before switching the laser from OFF to ON or from ON to OFF, cannot be corrected sufficiently.

The present invention has been made to solve the above-described problem, and has as its object to provide an image formation technique which enables stable image formation without any variation in dot size or dot formation position based in image data by correcting the relationship between the laser ON/OFF signal and the actual laser emission time including the laser rise time Tr (to be also referred to as a "rise delay time" hereinafter) and fall time Tf (to be also referred to as a "fall delay time" hereinafter) to a constant relationship independently of duration of the immediately preceding state based on image data, i.e., an image formation technique capable of suppressing the variation in laser emission time by correcting the timing of the laser ON/OFF signal, thereby stabilizing the dot size or dot formation position in image formation.

SUMMARY OF THE INVENTION

In order to solve the above-described problem, an image formation apparatus according to the present invention is characterized by mainly comprising the following arrangement.

According to the present invention, the foregoing object is attained by providing an image formation apparatus for executing image formation by exposing an image carrier with irradiation light emitted from a laser source, on the basis of an input signal to drive the laser source, comprising: a correction amount calculation unit configured to calculate, on the basis of a generated correction pattern, a correction amount to control one of an ON timing and an OFF timing to drive the laser source; and a signal generation unit configured to generate, on the basis of image data and the correction amount calculated by the correction amount calculation unit, a corrected signal obtained by correcting the input signal to drive the laser source so as to form the image data by controlling one of the ON timing and the OFF timing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A and 10B are views for explaining correction patterns transferred to the transfer belt;

DETAILED DESCRIPTION OF THE PREFERRED EMBODIMENTS

Preferred embodiments of the present invention will now be described in detail in accordance with the accompanying drawings.

First Embodiment

The first embodiment of the present invention will be described below with reference to the accompanying drawings.

Figure 1:
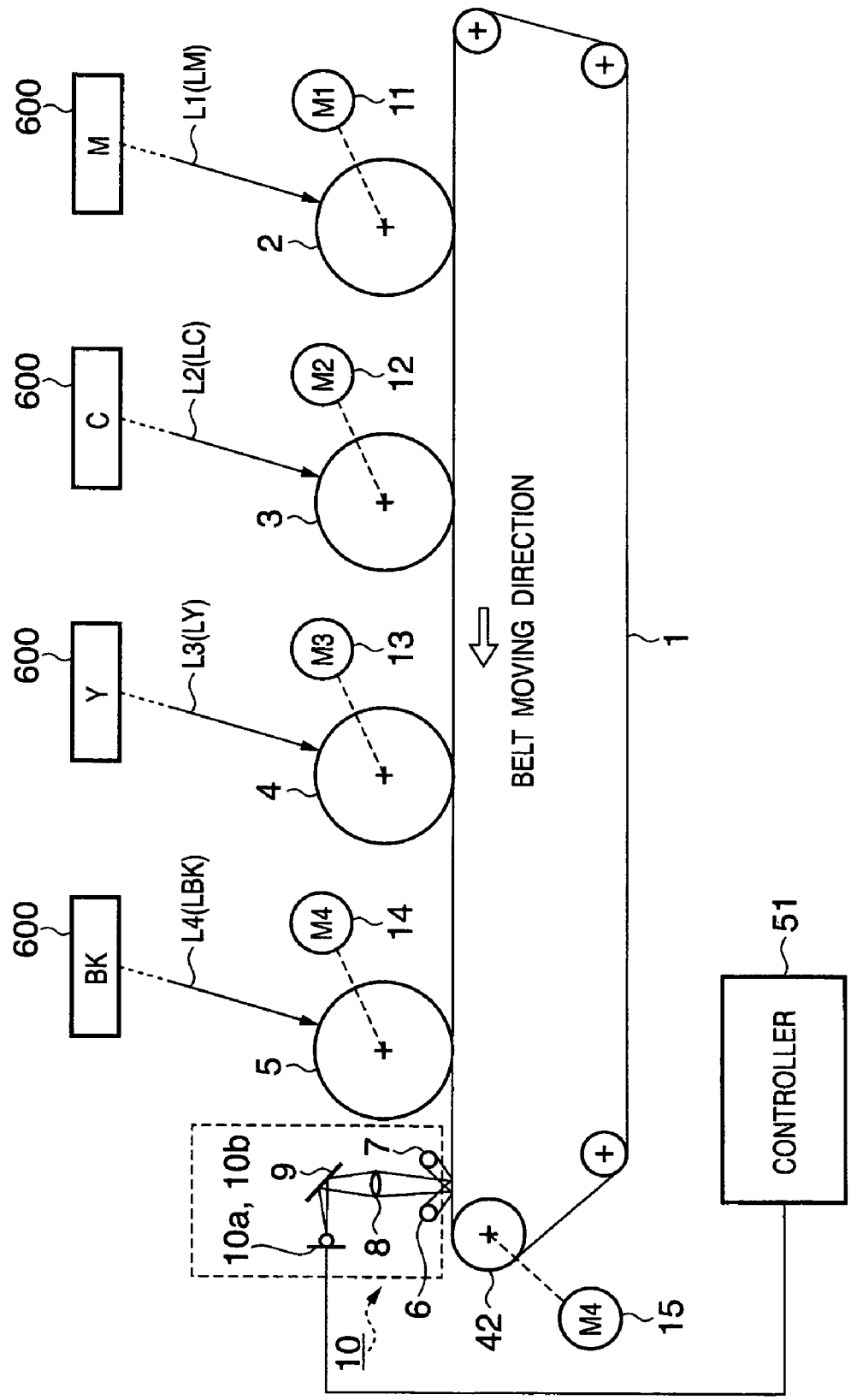
FIG. 1 is a schematic view showing the arrangement of an image formation apparatus according to the first embodiment of the present invention.

FIG. 1 is a schematic view for explaining the arrangement of a color image formation apparatus according to the embodiment of the present invention. An image formation operation will be described first with reference to FIG. 1. A transfer belt 1 moves at a predetermined velocity when drive of a pulse motor 15 is transmitted to a driving roller 42. Photosensitive drums 2 to 5 serving as image carriers correspond to magenta (M), cyan (C), yellow (Y), and black (BK), respectively. The photosensitive drums 2 to 5 are rotated by drum motors 11 to 14, respectively, and uniformly charged by a charging unit (not shown). Laser beams LM (L1), LC (L2), LY (L3), and LBK (L4) corresponding to the photosensitive drums of the respective colors are emitted from laser units 600 (M), 600 (C), 600 (Y), and 600 (BK), respectively. Latent images formed by scanning the laser beams LM (L1), LC (L2), LY (L3), and LBK (L4) are visualized by toners stored in developing units (not shown).

The images formed on the photosensitive drums 2 to 5 are transferred, at a predetermined timing, to a transfer paper sheet which is fed from a paper feed unit (not shown) and electrostatically drawn on the transfer belt 1. The paper sheet is conveyed in the direction of the arrow in FIG. 1 as the pulse motor 15 is driven. The images are fixed through a fixing unit (not shown). Then, the paper sheet is discharged. In this way, an image is formed on the transfer paper sheet.

This image formation apparatus has a registration correction means for superimposing magenta (M), cyan (C), yellow (Y), and black (BK) images. The correction means includes a reading unit (e.g., a CCD (Charge Coupled Device) sensor or contact image sensor (CIS); to be simply referred to as a "CCD sensor or the like" hereinafter) and a controller 51 to control the reading unit. In this embodiment, the rise time and fall time correction amount is determined by using the reading unit.

The registration correction method will be described. A pair of registration correction patterns of magenta (M), cyan (C), yellow (Y), and black (BK) are formed at predetermined position in the width direction perpendicular to the conveyance direction of the transfer belt 1 (belt moving direction) so as to oppose each other.

A pair of reading means (CCD sensors or the like) 10 are provided perpendicularly to the conveyance direction of the transfer belt 1. Each reading means comprises illumination lamps 6 and 7, condenser lens 8, and reflecting mirror 9. The reading means has sensors 10a and 10b formed from CCD sensors or the like. The registration correction patterns are read by forming, on the sensors 10a and 10b, an image of reflected light obtained by illuminating the registration correction patterns (e.g., cross-shaped marks having a predetermined width) formed on the transfer belt 1 which moves as the pulse motor 15 is driven.

The controller 51 controls reading of the registration correction patterns and calculates the misregistration amount of each color from the read patterns. On the basis of the calculation result, the electrical image start timings in the main scanning direction (direction perpendicular to the belt moving direction) and sub-scanning direction (direction corresponding to the belt moving direction) and the correction amounts of changes in optical path length and optical path of the laser. Main scanning position correction data is sent to a main scanning position correction unit 602 (to be described later). Sub-scanning position correction data is sent to a laser ON/OFF signal generation unit 605 (to be described later). In addition, pulse data of a pulse motor (not shown) which controls a reflecting mirror provided in the optical path to correct the changes in optical path length and optical path of the laser is supplied to a pulse motor driver (not shown). In this way, registration correction to superimpose magenta (M), cyan (C), yellow (Y), and black (BK) images is executed.

The laser unit 600 will be described next with reference to FIG. 2.

Figure 2:
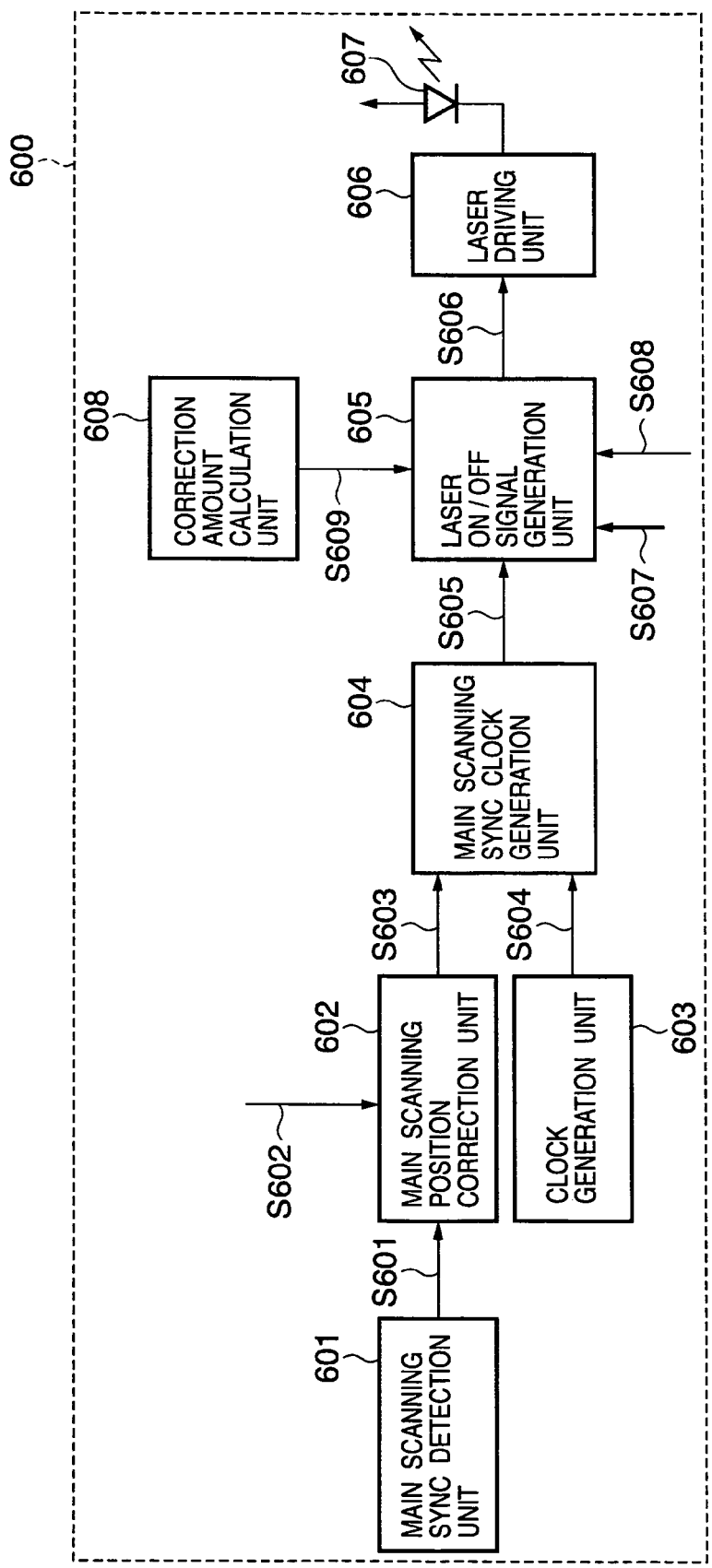
FIG. 2 is a block diagram showing the arrangement of the laser unit of the image formation apparatus according to the first embodiment of the present invention.
Figure 3A:
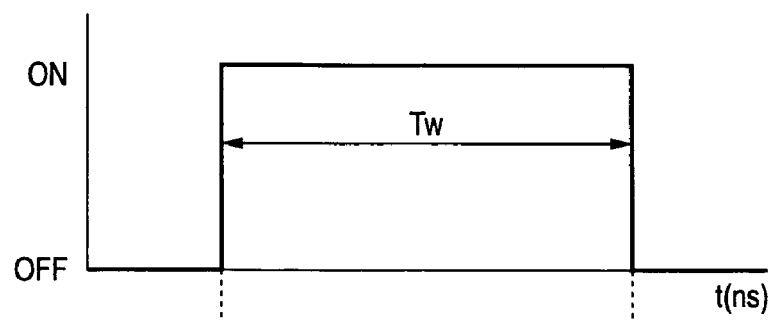
FIGS. 3A to 3C are timing charts showing the relationship between a laser ON/OFF signal, a current flowing to a laser, and a laser emission time in a prior art.
Figure 3B:
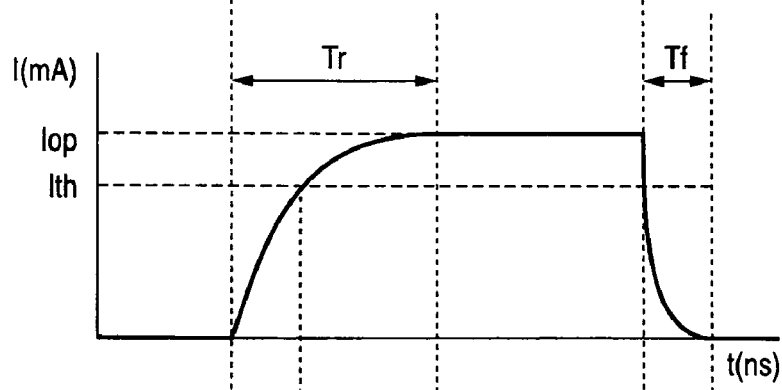
Figure 3C:
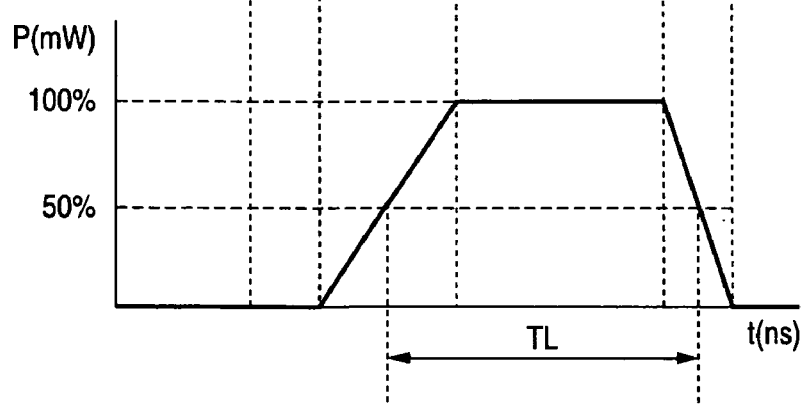
Figure 4A:
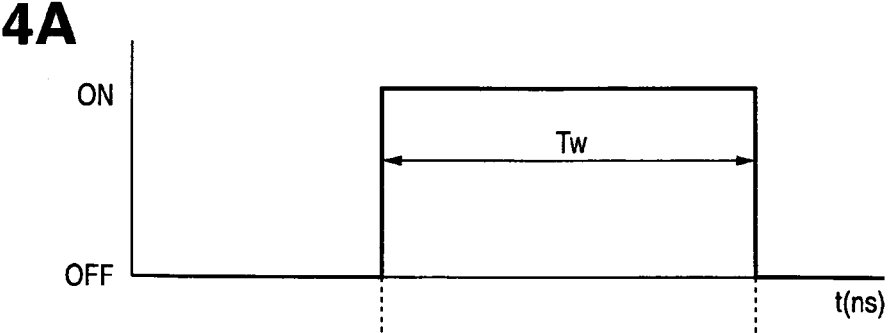
FIGS. 4A to 4D are timing charts showing the relationship between the laser ON/OFF signal, a corrected laser ON/OFF signal, the current flowing to the laser, and the laser emission time in the prior art.
Figure 4B:
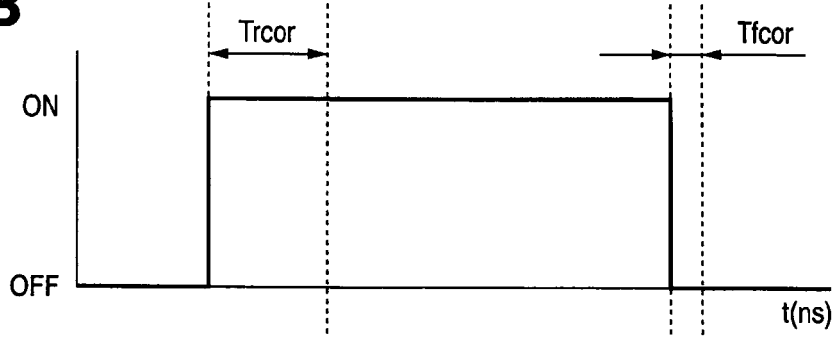
Figure 4C:
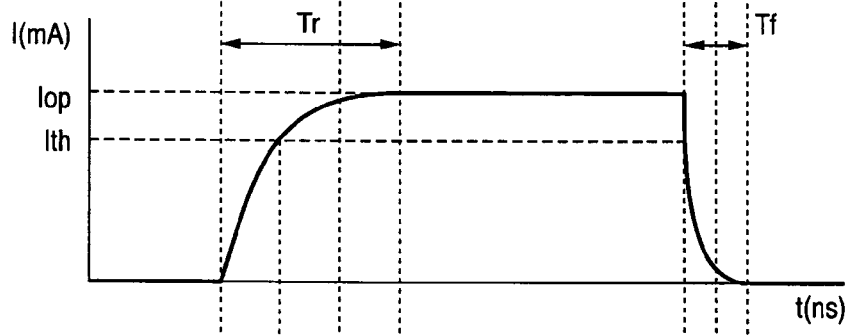
Figure 4D:
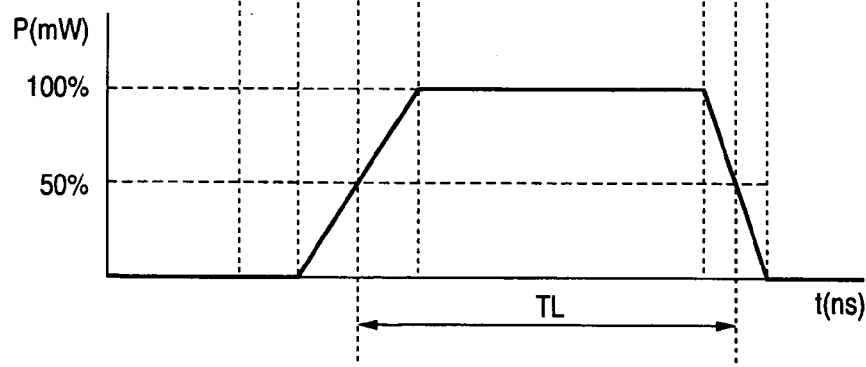
Figure 5A:
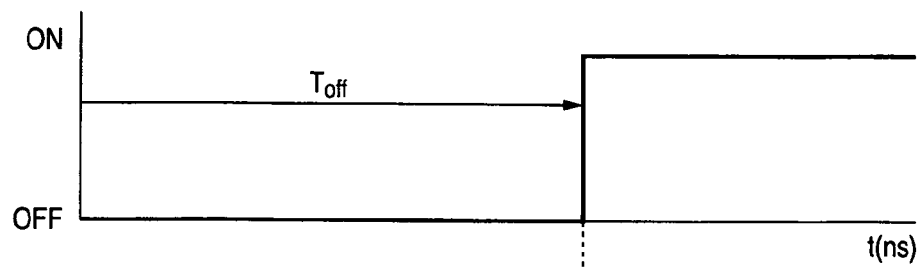
FIGS. 5A to 5D are timing charts showing a state wherein the manner the current flowing to the laser rises changes in accordance with the pattern of the laser ON/OFF signal in the prior art.
Figure 5B:
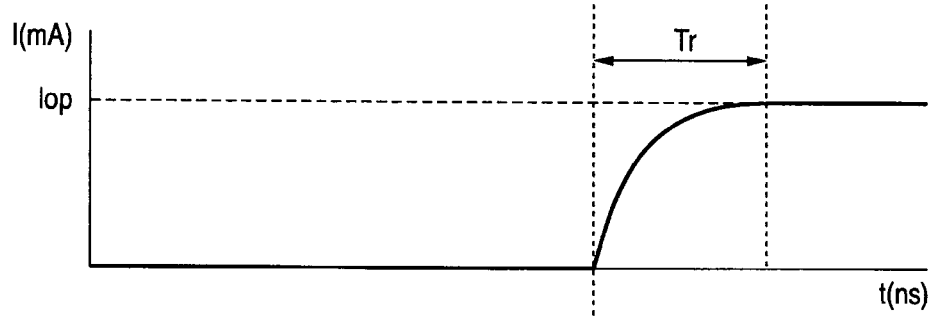
Figure 5C:
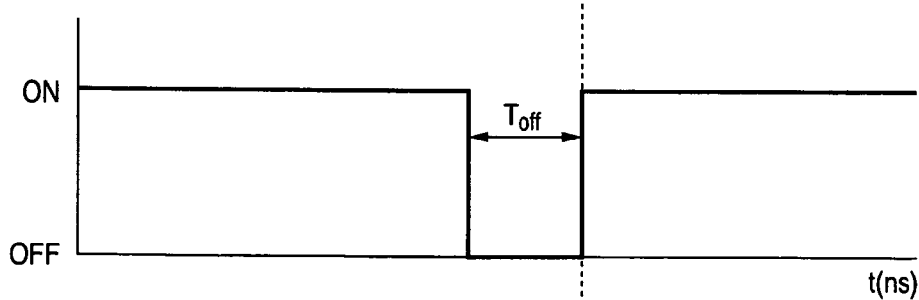
Figure 5D:
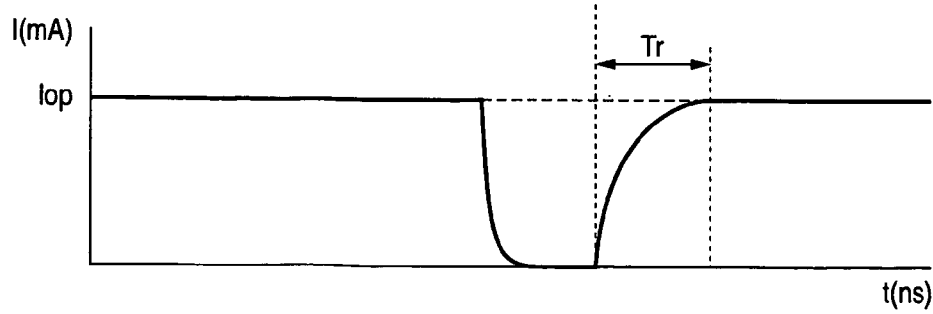
Figure 6A:
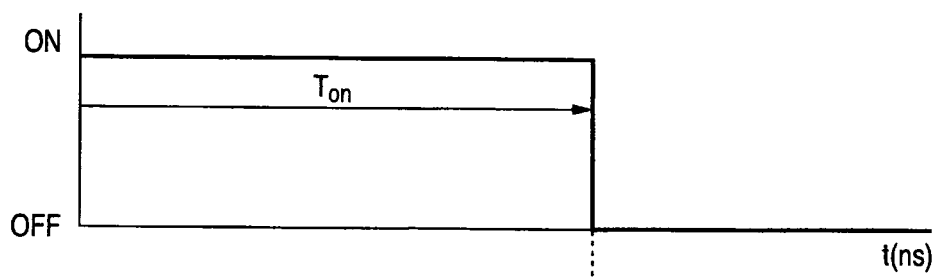
FIGS. 6A to 6D are timing charts showing a state wherein the manner the current flowing to the laser falls changes in accordance with the pattern of the laser ON/OFF signal in the prior art.
Figure 6B:
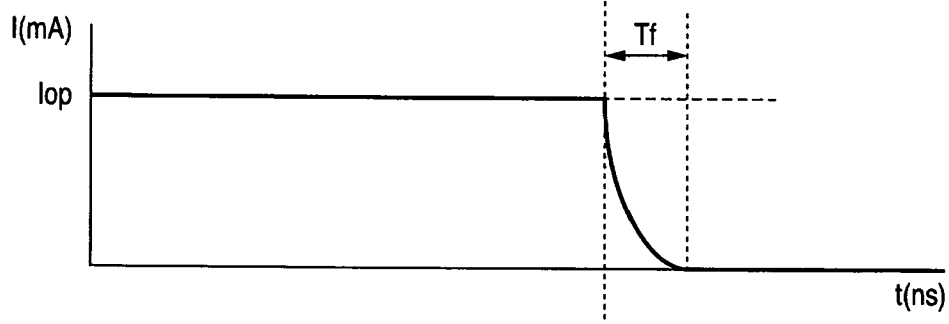
Figure 6C:
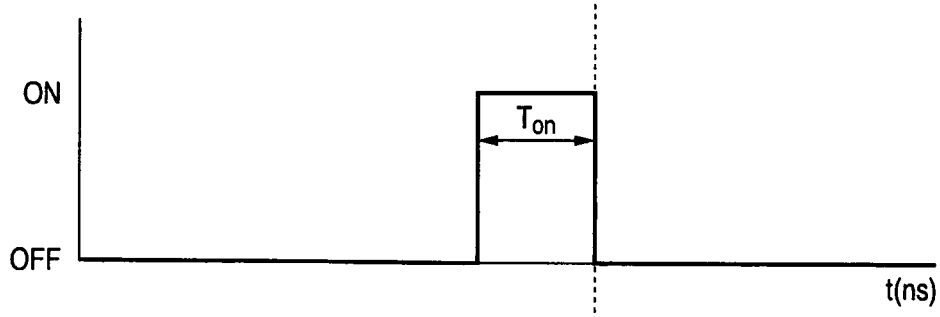
Figure 6D:
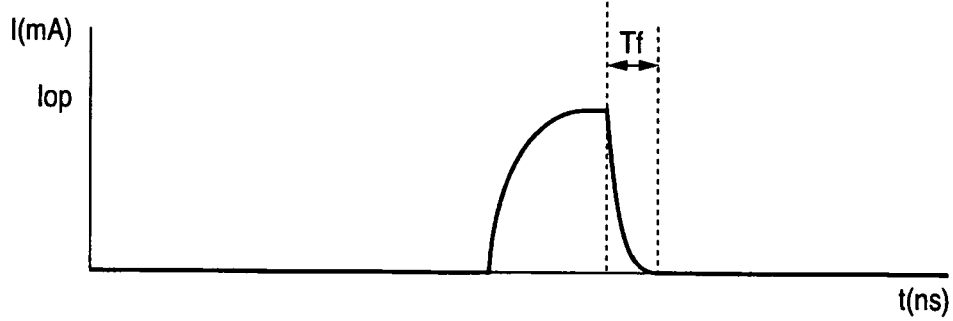
Figure 7:
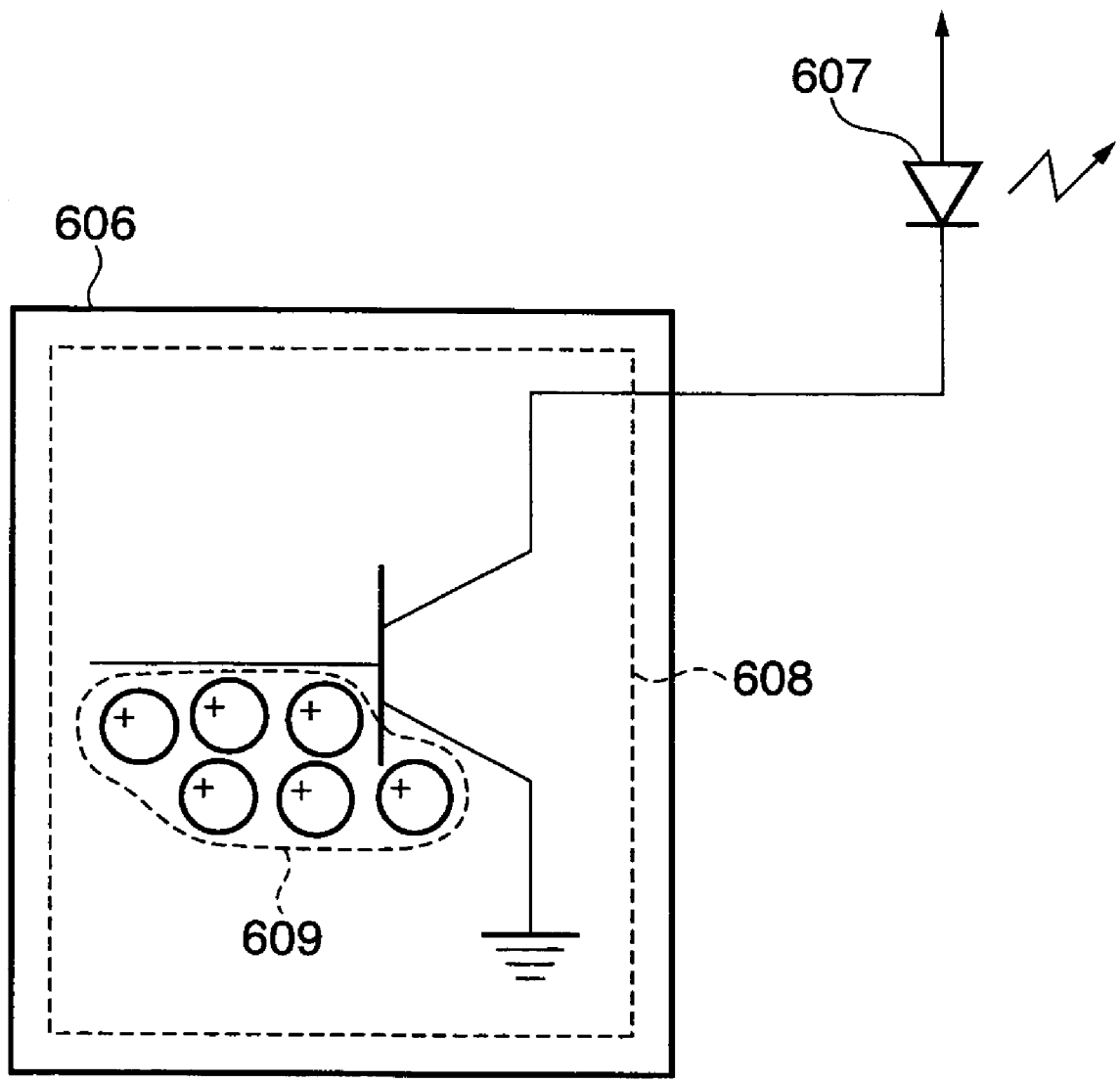
FIG. 7 is a view for explaining a laser driving element in the image formation apparatus according to the first embodiment of the present invention.

Referring to FIG. 2, reference numeral 601 denotes a main scanning sync detection unit 601; and 603, a clock generation unit 603 which generates a primary clock. A correction circuit 602 corrects a main scanning sync signal S601 output from the main scanning sync detection unit 601 by a delay amount corresponding to a position correction amount designation signal S602 designated by the controller 51. The color copying machine has a total of four laser units shown in FIG. 2 for yellow (Y), magenta (M), cyan (C), and black (BK). The controller 51 shown in FIG. 1 calculates the relative misregistration amount of each color in the main scanning direction and inputs the position correction amount corresponding to each color to the main scanning position correction unit 602 of the color, thereby correcting the misregistration of each color of each pixel in the main scanning direction.

A main scanning sync clock generation unit 604 receives a corrected main scanning sync signal S603 output from the main scanning position correction unit 602 and a primary clock S604 output from the clock generation unit 603 and outputs a pixel clock S605 synchronized with the corrected main scanning sync signal S603.

The laser ON/OFF signal generation unit 605 generates a laser ON/OFF signal S606 (correction signal) in accordance with the pixel clock S605 output from the main scanning sync clock generation unit 604, image data S607 input from an image processing unit (not shown), sub-scanning position correction data S608 input from the controller 51 to execute registration correction of each color, and laser ON duty correction data S609 input from a correction amount calculation unit 608 (to be described later).

A laser driving unit 606 drives a laser 607 in accordance with the laser ON/OFF signal S606 output from the laser ON/OFF signal generation unit 605.

The response time of laser emission changes because of a variation in laser current rise/fall time in the laser driving unit 606 (e.g., a variation in time constant caused by the characteristic of each circuit element included in the laser driving unit) or a variation in driving threshold or current vs. output light characteristic of the laser. For this reason, the laser ON/OFF signal S606 and the emission time of the laser 607 have no predetermined relationship.

As the velocity and resolution of the image formation apparatus increase, the emission time per dot becomes short. Hence, the variation in laser current rise/fall cannot be neglected. The arrangement and processing method of the image formation apparatus to correct the variation in laser emission characteristic and obtain a stable image will be described below in detail. As described above, the delay of laser current rise time, which occurs in switching the laser from OFF to ON, changes in accordance with the immediately preceding continuous OFF time of the laser. In addition, the delay of laser current fall time, which occurs in switching the laser from ON to OFF, changes in accordance with the immediately preceding continuous ON time of the laser.

Let Toff be the continuous laser OFF time, Tr be the laser current rise time, Trcor be the laser ON timing correction time, Ton be the continuous laser ON time, Tf be the laser current fall time, and Tfcor be the laser OFF timing correction time. The relationships between them and correction times are obtained in the following way.

The relationship between the continuous laser OFF time Toff, the laser current rise time Tr, and the laser ON timing correction time Trcor and the correction time calculation method will be described.

Figure 9B:
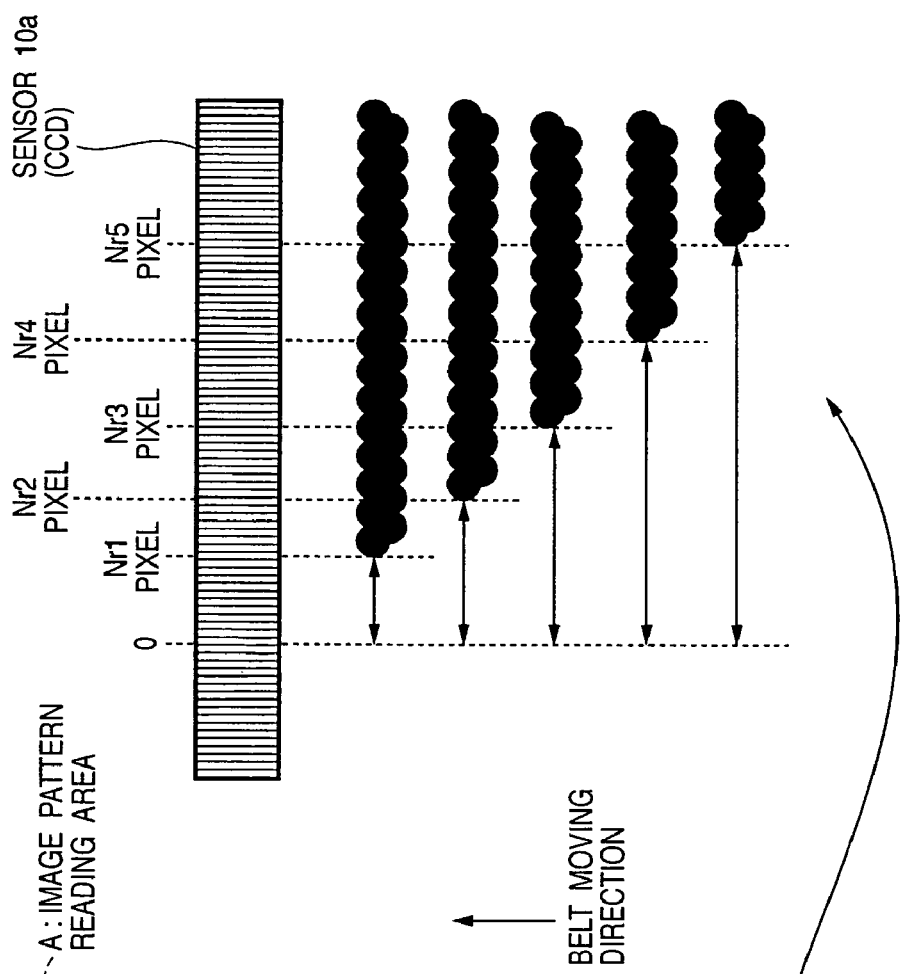
FIGS. 9A and 9B are views for explaining a correction pattern transferred to a transfer belt.
Figure 9A:
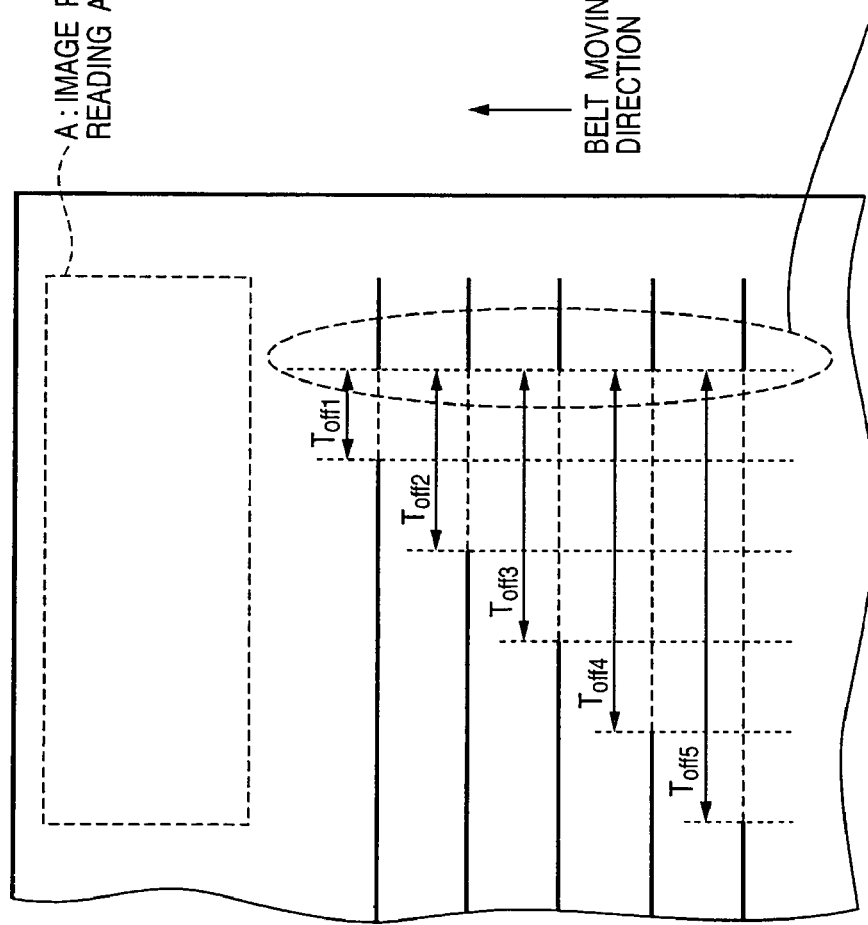

FIG. 9A shows the transfer belt 1 viewed from the upper side at the neighborhood of a reading area A by the reading unit 10. Lines on the belt, which are perpendicular to the belt moving direction, schematically indicate correction patterns formed on the belt. A solid line indicates a portion with toner where an image is generated by turning on the laser. A dotted line indicates a portion without toner where the laser is turned off. FIG. 9A shows five types of correction patterns. However, the present invention is not limited to this, and a plurality of types of patterns can further be taken into consideration.

Multiple laser OFF durations Toff1 to Toff5, . . . are defined, as shown in FIG. 9A. Uncorrected patterns which always have the laser ON timing at a predetermined main scanning position are formed in correspondence with the respective laser OFF durations. In this case, reading results as shown in FIG. 9B are obtained by the reading unit 10. A point 0 in FIG. 9B is the target position to turn on the laser to form the leading edge of the correction pattern image. This position is the target position where the laser source should emit a laser beam to form image data. That is, when the leading edge of the image matches the point 0, the laser ON timing has no delay.

As the laser OFF duration Toff is prolonged, the laser current rise time Tr is also prolonged (delayed). For this reason, the leading pixel position of the pattern image read by the reading unit 10 formed from the CCD sensor or the like shifts to the subsequent read cell (to the right in FIG. 9B) of the CCD sensor or the like, as shown in FIG. 9B. This shift is corrected such that the leading edge matches the target position at the point 0.

When the leading edge of each pattern on the belt, which corresponds to the position of the cell where the leading edge of the image is read by the CCD sensor or the like, is divided by the scanning velocity of the laser in the main scanning direction, the rise time Tr can be obtained. The laser current rise time Tr obtained here and Toff have, e.g., a relationship shown in FIG. 11A.

Figure 11A:
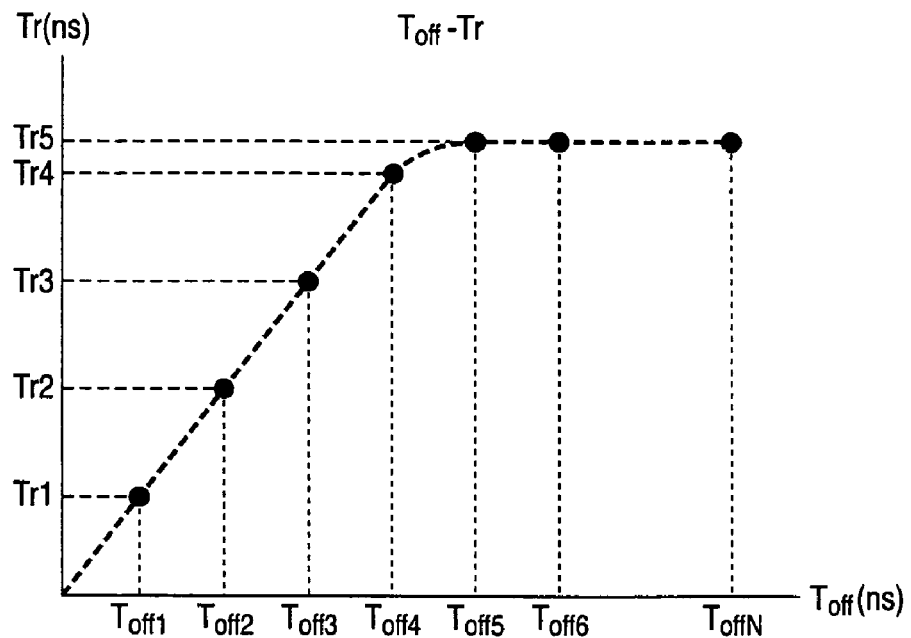
FIGS. 11A and 11B are timing charts showing the relationship between a laser OFF duration (Toff), a laser current rise time (Tr), and a laser ON signal timing correction amount.

As shown in FIG. 11A, there are a range from Toff1 to Toff5 where the rise time is prolonged (delayed) in accordance with the change in laser OFF time and a range where the rise time is saturated even when the laser OFF time becomes long. The relationship between the laser OFF duration Toff and the laser current rise time Tr largely depends on the characteristics of individual laser driving elements. Hence, the number of data and data interval are preferably determined appropriately in accordance with each apparatus.

Figure 11B:
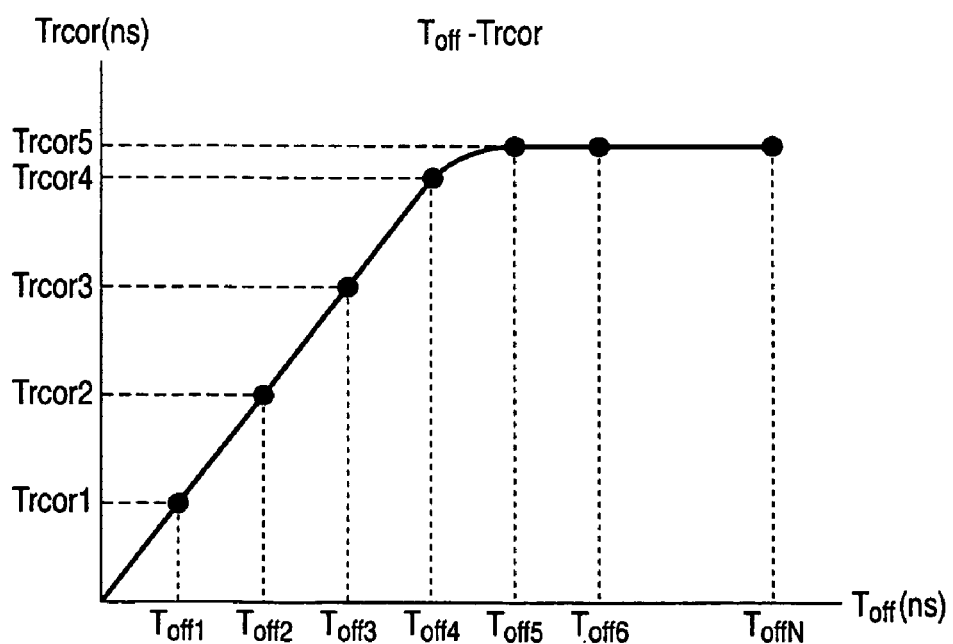

FIG. 11B is a timing chart showing the relationship between the laser OFF duration Toff and the laser ON signal timing correction amount Trcor, which is generated on the basis of the relationship between the laser OFF duration Toff and the laser current rise time Tr shown in FIG. 11A. In this embodiment, Tr=Trcor. That is, the laser ON timing is advanced by the same time as the laser current rise time. In the above-described way, the relationship between the laser OFF duration and the laser current rise time and the laser ON timing correction time to correct the relationship can be obtained.

The relationship between the continuous laser ON time Ton, the laser current fall time Tf, and the laser OFF timing correction time Tfcor and the correction time calculation method will be described.

Like FIG. 9A, FIG. 10A shows the transfer belt 1 viewed from the upper side at the neighborhood of the reading area A by the reading unit 10. A solid line indicates a portion with toner where an image is generated by turning on the laser. A dotted line indicates a portion without toner where the laser is turned off. FIG. 10A also shows five types of correction patterns, like FIG. 9A. However, the present invention is not limited to this, and a plurality of types of patterns can further be taken into consideration.

Multiple laser ON durations Ton1 to Ton5, . . . are defined, as shown in FIG. 10A. Uncorrected patterns which always have the laser OFF timing at a predetermined main scanning position are formed in correspondence with the respective laser ON durations. In this case, reading results as shown in FIG. 10B are obtained by the reading unit 10. A point 0 in FIG. 10B is the target position to turn off the laser to form the trailing edge of the correction pattern image. This position is the target position where the laser source should stop laser emission to form image data. That is, when the trailing edge of the image matches the point 0, the laser OFF timing has no delay.

As the laser ON duration Ton is prolonged, the laser current fall time Tf is also prolonged (delayed). For this reason, the trailing pixel position of the pattern image read by the reading unit 10 formed from the CCD sensor or the like shifts to the subsequent read cell (to the right in FIG. 10B) of the CCD sensor or the like, as shown in FIG. 10B. This shift is corrected such that the trailing position matches the target position at the point 0.

When the trailing position of each pattern on the belt, which corresponds to the position of the cell where the trailing edge of the image is read by the CCD sensor or the like, is divided by the scanning velocity of the laser in the main scanning direction, the fall time Tf can be obtained. The laser current fall time Tf obtained here and Ton have, e.g., a relationship shown in FIG. 12A.

Figure 12A:
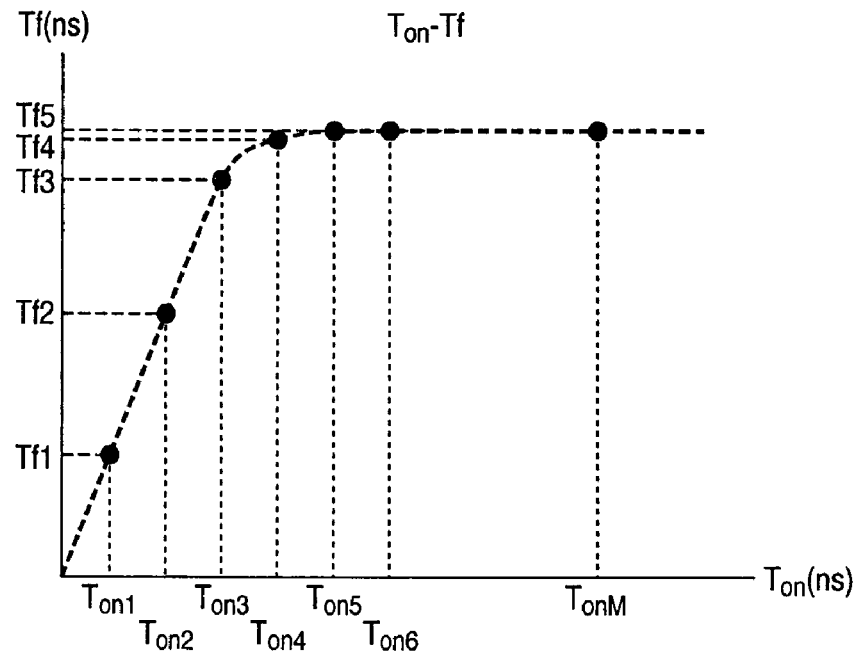
FIGS. 12A and 12B are timing charts showing the relationship between a laser ON duration (Ton), a laser current fall time (Tf), and a laser OFF signal timing correction amount.

As shown in FIG. 12A, there are a range from Ton1 to Ton5 where the fall time is prolonged (delayed) in accordance with the change in laser ON time and a range where the fall time is saturated even when the laser ON time becomes long. The relationship between the laser ON duration Ton and the laser current fall time Tf also largely depends on the characteristics of individual laser driving elements. Hence, the number of data and data interval are preferably determined appropriately in accordance with each apparatus.

Figure 12B:
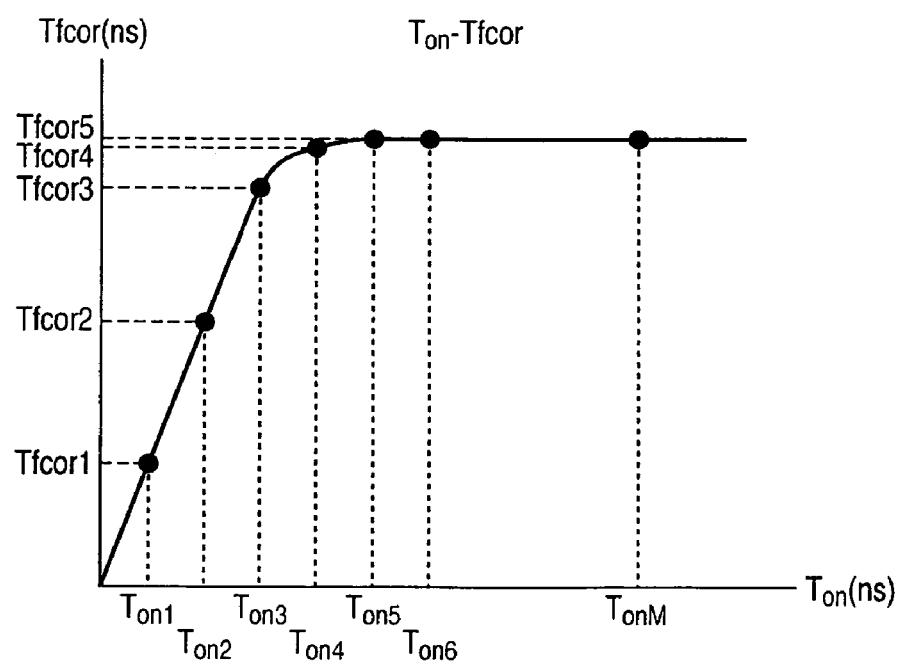

FIG. 12B is a timing chart showing the relationship between the laser ON duration Ton and the laser OFF signal timing correction amount Tfcor, which is generated on the basis of the relationship between the laser ON duration Ton and the laser current fall time Tf shown in FIG. 12A. In this embodiment, Tf=Tfcor. That is, the laser OFF timing is advanced by the same time as the laser current fall time. In the above-described way, the relationship between the laser ON duration and the laser current fall time and the laser OFF timing correction amount to correct the relationship can be obtained.

The above-described series of processing operations until correction amount calculation is controlled by the correction amount calculation unit 608 shown in FIG. 2. The correction amount calculation unit 608 sends the obtained correction data S609 to the laser ON/OFF signal generation unit 605.

Figure 8:
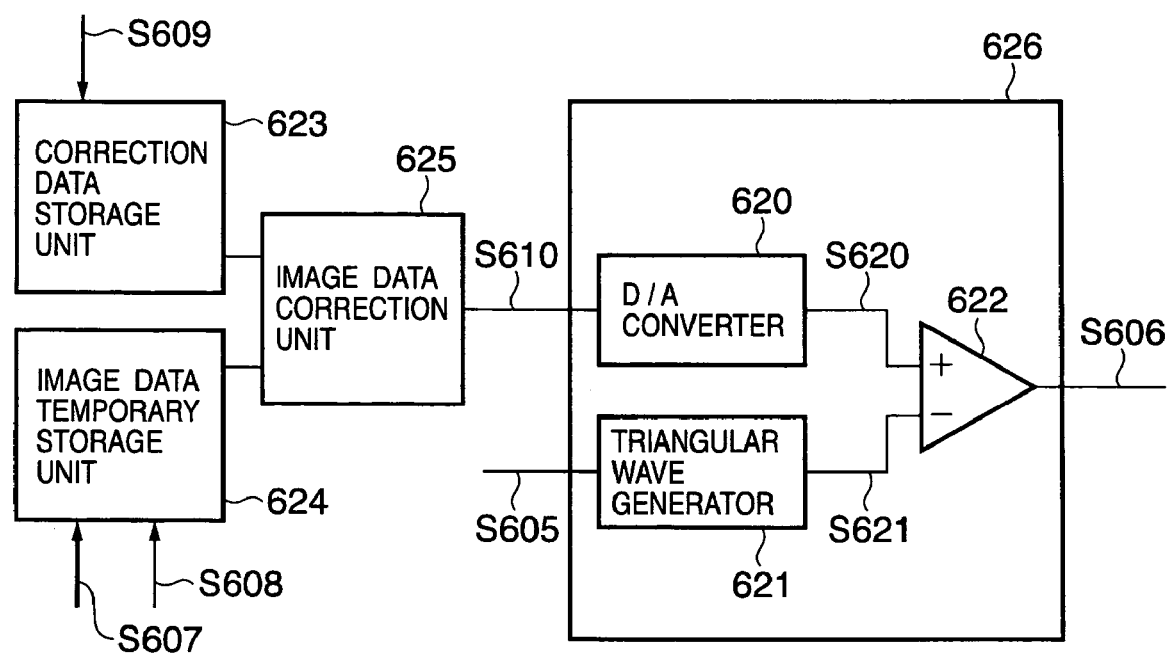
FIG. 8 is a block diagram showing the arrangement of a laser ON/OFF signal generation unit 605 in the image formation apparatus according to the first embodiment of the present invention.

FIG. 8 is a block diagram showing the arrangement of the laser ON/OFF signal generation unit 605. An image data temporary storage unit 624 temporarily stores the image data S607 input from the image processing unit (not shown). A correction data storage unit 623 stores the laser ON/OFF signal correction data S609 input from the correction amount calculation unit 608. An image data correction unit 625 is connected to these units (623 and 624). The image data correction unit 625 output image data considering the corrected image formation timing to a PWM modulation circuit 626 of the succeeding stage while adding correction data stored in the correction data storage unit 623 to image data sequentially read out from the image data temporary storage unit 624.

The image data correction unit 625 obtains the laser OFF duration and laser ON duration from the image data stored in the image data temporary storage unit 624. The correction data stored in the correction data storage unit 623 is added in accordance with the laser OFF duration. Similarly, the correction data stored in the correction data storage unit 623 is added in accordance with the laser ON duration.

Image data S610 whose laser ON/OFF timing is corrected is output to the PWM modulation circuit 626 of the succeeding stage. A D/A converter 620 D/A-converts the image data S610 whose laser ON time or OFF time is corrected. A triangular wave generator 621 is formed from, e.g., an integrator. The triangular wave generator 621 is driven by the pixel clock S605 output from the main scanning sync clock generation unit 604 to generate a triangular wave with the same period as the pixel clock S605.

A comparator 622 compares an analog signal S620 corresponding to image data output from the D/A converter 620 and a triangular wave S621 output from. the triangular wave generator 621. The laser ON/OFF signal S606 corresponding to the image data S610 with the corrected laser ON/OFF timing is generated by the triangular wave generator 621 and comparator 622.

Figure 13A:
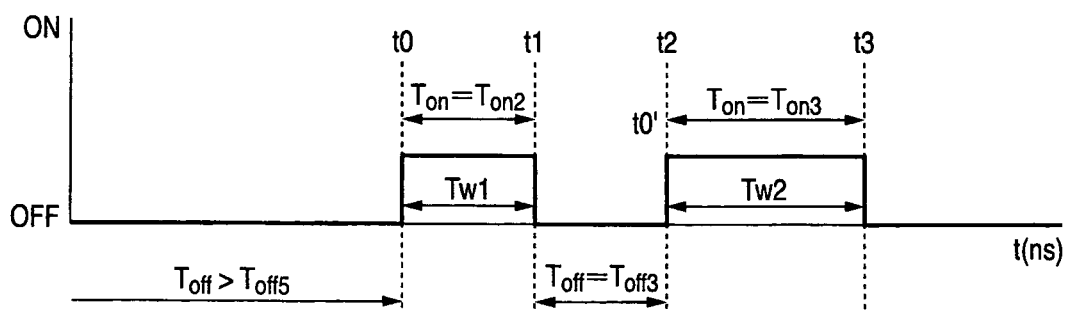
FIGS. 13A to 13D are timing charts showing the relationship between the laser ON/OFF signal, the corrected laser ON/OFF signal, the laser current based on the corrected laser ON/OFF signal, and the laser emission time.
Figure 13B:
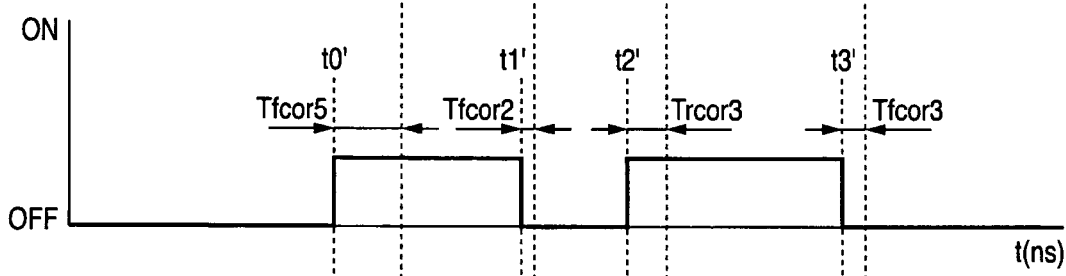
Figure 13C:
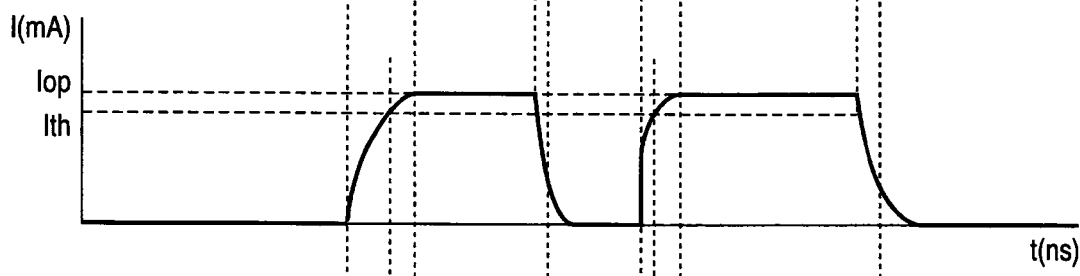
Figure 13D:
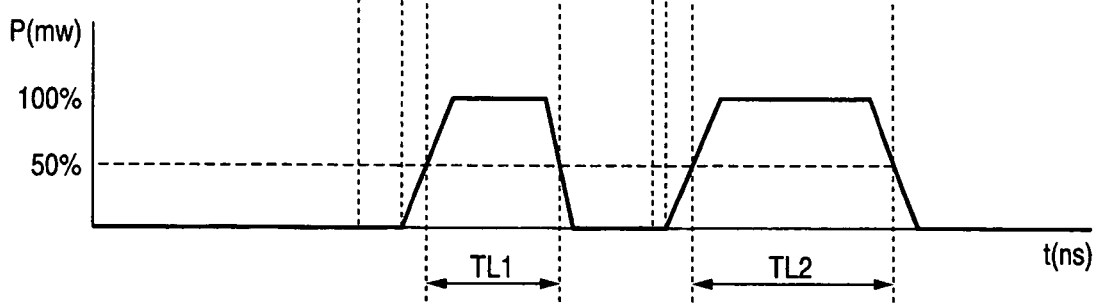

FIGS. 13A to 13D are timing charts showing processing of obtaining a predetermined relationship between the ON/OFF duration (duration) of each pixel in the laser ON/OFF signal S606 and the laser ON/OFF duration (duration) by the above-described correction. FIG. 13A is a timing chart showing the relationship between the laser ON/OFF signal and the time (ns). FIG. 13B is a timing chart showing the relationship between the corrected laser ON/OFF signal and the time (ns). FIG. 13C is a timing chart showing the relationship between the time (ns) and a laser current flowing to the circuit to drive the laser source which is turned on by the corrected laser ON/OFF signal. FIG. 13D is a timing chart showing the relationship between the time (ns) and the intensity of a light beam emitted from the laser by the laser current shown in FIG. 13C.

In laser ON timing correction, at time t0, the immediately preceding laser OFF duration Toff satisfies Toff>Toff5 (for "Toff5", see FIG. 9A which explains the correction patterns). Hence, the laser current rise time is advanced by Trcor=Tr5. This relationship can be obtained by the correction amount calculation unit 608 in advance as the correction amount on the basis of the relationship shown in FIGS. 11A and 11B.

Similarly, at time t2 in FIG. 13A, the immediately preceding laser OFF duration Toff satisfies Toff>Toff3 (for "Toff3", see FIG. 9A which explains the correction patterns). Hence, the laser current rise time is advanced by Trcor=Tr3 (FIG. 11B). In this way, the laser ON timings at the times t0 and t2 shown in FIG. 13A are corrected to times t0' and t2' shown in FIG. 13B.

In laser OFF timing correction, at time t1 in FIG. 13A, the immediately preceding laser ON duration Ton satisfies Ton>Ton2 (for "Ton2", see FIG. 10A which explains the correction patterns). Hence, the laser current fall time is advanced by Tfcor=Tf2 (FIG. 12A). Similarly, at time t3, the immediately preceding laser ON duration Ton satisfies Ton>Ton3 (for "Ton3", see FIG. 10A which explains the correction patterns). Hence, the laser current fall time is advanced by Tfcor=Tf3 (FIG. 12A). In this way, the laser current OFF timings at the times t1 and t3 shown in FIG. 13A are corrected to times t1' and t3' shown in FIG. 13B.

By the corrected laser ON/OFF signal (FIG. 13B), the laser current is obtained as a waveform which gradually increases and decreases with a gradient time constant shown in FIG. 13C. When the laser current reaches a threshold current Ith, the laser starts emitting light, as shown in FIG. 13D. On the other hand, when the laser current becomes smaller than the threshold current Ith, the laser stops emission. The time constant is determined by the circuit to drive the laser source.

As shown in FIG. 13D, laser emission times TL1 and TL2 indicated by the half width of laser output based on the corrected laser ON/OFF signal (time to ensure the 50% intensity of the light beam) match ON times Tw1 and Tw2 of the laser ON/OFF signal before correction shown in FIG. 13A.

Figure 15:
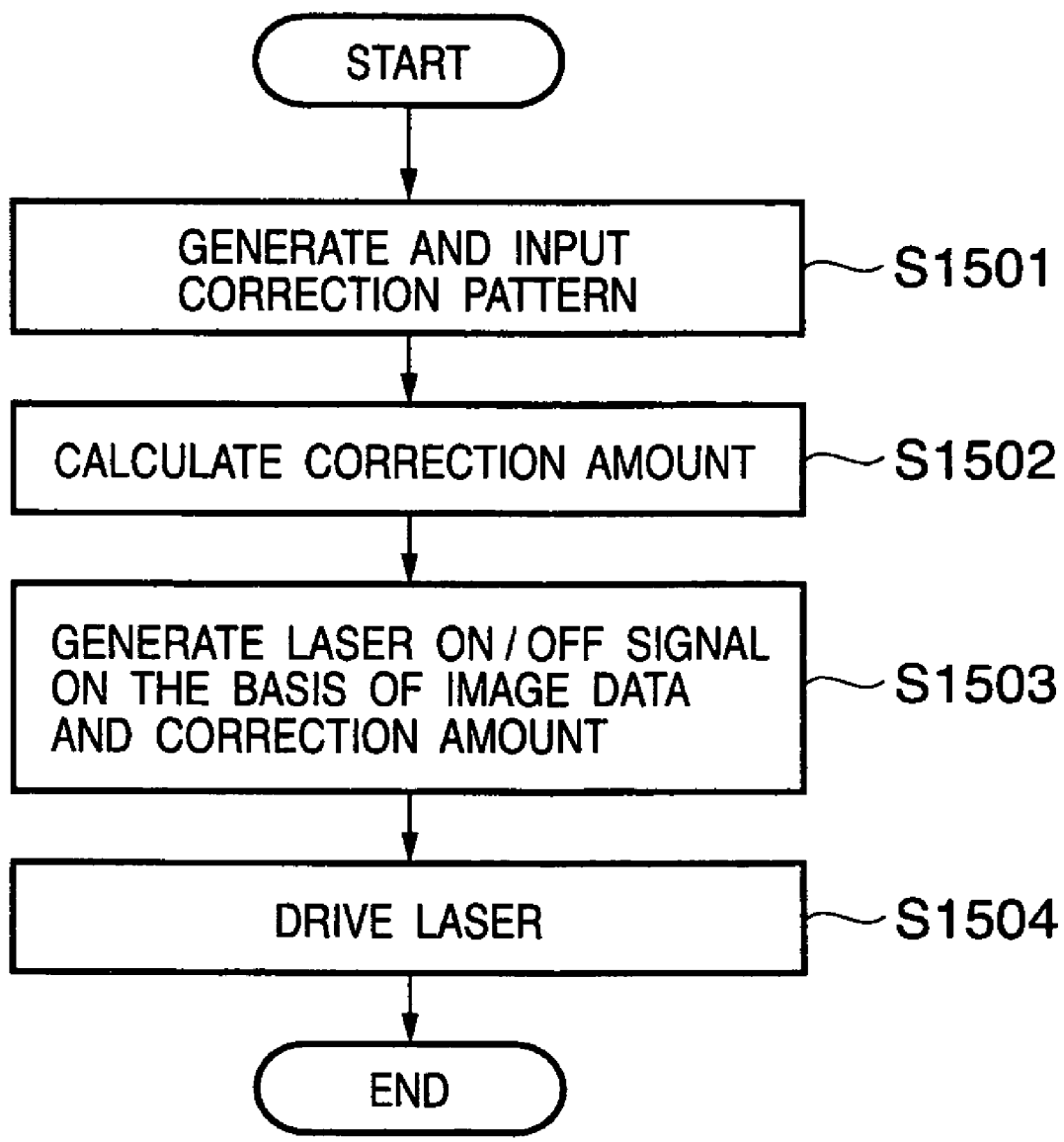
FIG. 15 is a flowchart for explaining the flow of correction processing according to the embodiment of the present invention.

FIG. 15 is a flowchart for explaining the flow of correction processing according to the embodiment of the present invention. In step S1501, the correction patterns as shown in FIG. 9A are generated. In step S1502, the correction amount calculation unit 608 calculates the correction amount on the basis of the correction patterns. In step S1503, the laser ON/OFF signal generation unit 605 generates a laser ON/OFF signal on the basis of image data and the correction amount calculated in step S1502. In step S1504, the laser driving unit 606 drives the laser source on the basis of the laser ON/OFF signal generated in step S1503.

In this embodiment, the correction patterns generated in step S1501 are read on the transfer belt 1 by the reading unit 10. However, the steps of this flowchart may be executed by using reading units 20 to 23 provided around the photosensitive drums, as in the second embodiment to be described later.

In this embodiment, correction is performed in accordance with the continuous laser OFF time to advance the laser ON timing as the end of the continuous OFF time. In addition, correction is performed in accordance with the continuous laser ON time to advance the laser OFF timing as the end of the continuous ON time. With this processing, predetermined laser emission times (TL1 and TL2) are ensured without delaying an ON time Tw of the laser ON/OFF signal and a laser emission time TL.

The correction processing of the correction amount calculation unit 608 is not limited to the above-described processing. Instead, correction may be performed in accordance with the continuous laser OFF time to delay the laser OFF timing as the start of the continuous OFF time, and correction may be performed in accordance with the continuous laser ON time to delay the laser ON timing as the start of the continuous ON time such that the ON time Tw of the laser ON/OFF signal equals the laser emission time TL.

In this embodiment, the laser ON timing correction amount (correction time) Trcor is set equal to that of the laser current rise time Tr. In addition, the laser OFF timing correction amount (correction time) is set equal to that of the laser current fall time Tf. However, the relationship between Trcor and Tr and that between Tfcor and Tf are not limited to these. The correction amount calculation unit 608 can determine them in accordance with the image formation conditions, the type of light source, and the characteristic of the light source driving circuit in the image formation apparatus.

If the laser current fall time Tf can sufficiently be neglected relative to Tw (laser ON duration), the correction amount calculation unit 608 may correct only the rise time Tr without correcting the laser current fall time Tf.

If the laser current rise time Tr can sufficiently be neglected relative to Tw (laser ON duration), the correction amount calculation unit 608 may correct only the fall time Tf without correcting the laser current rise time Tr.

The laser ON/OFF signal generation unit 605 can selectively determine which one of the laser current rise time and fall time, only the rise time, and only the fall time is to be used to implement the desired laser emission time (the time to ensure a predetermined laser intensity in the laser source) TL on the basis of the relationship between the laser ON time TW, continuous ON time Toni (i=1, 2, ..., n), and continuous OFF time Toffi (i=1, 2, ..., n).

As described above, according to this embodiment, the variation in laser emission time can be suppressed by correcting the timing of the laser ON/OFF signal. Hence, the dot size or dot formation position in image formation can be stabilized.

Second Embodiment

The second embodiment of the present invention will be described next. The second embodiment is different from the first embodiment in that correction patterns to obtain the laser current rise time and fall time are formed not on a transfer belt 1 but on photosensitive drums, and reading units to read the correction patterns are provided near photosensitive drums 2 to 5.

Figure 14:
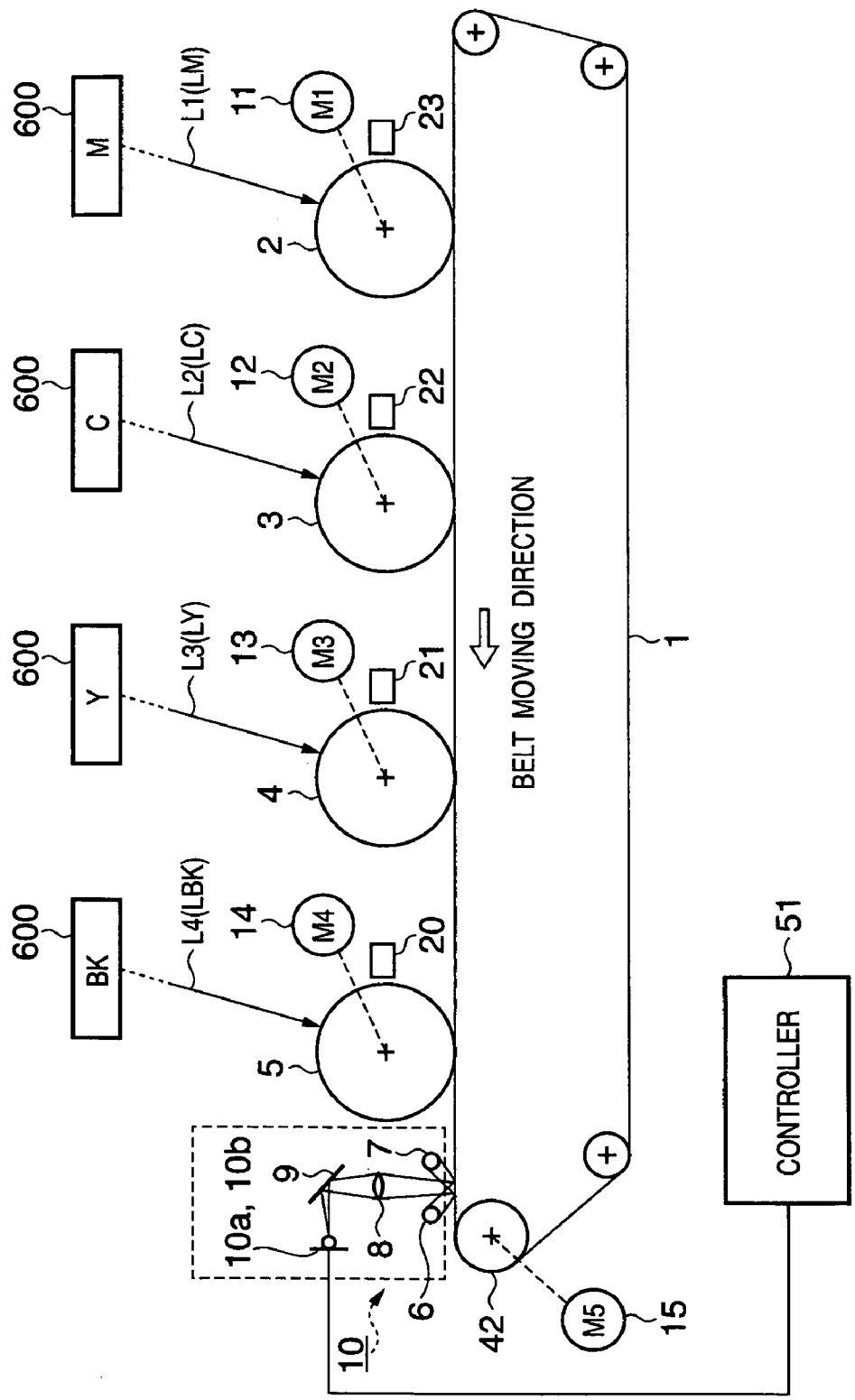
FIG. 14 is a schematic view showing the arrangement of an image formation apparatus according to the second embodiment of the present invention.

FIG. 14 is a block diagram for explaining the arrangement of a color image formation apparatus according to the second embodiment. In this embodiment, reading units 20 to 23 to read the correction patterns to obtain the laser current rise time and fall time are provided near the photosensitive drums 2 to 5 of the respective colors. The patterns described in FIGS. 9A, 9B, 10A, and 10B are formed not on the transfer belt but on the photosensitive drums and read. Hence, the reading accuracy can be increased without any influence of the image pattern transfer accuracy or swing of the transfer belt.

In this embodiment, a color image formation apparatus having the plurality of photosensitive drums 2 to 5 has been exemplified. Hence, a total of four reading units are necessary for the photosensitive drums 2 to 5, respectively. However, in a copying machine including one drum, only one reading unit is provided near the photosensitive drum.

According to this embodiment, the variation in laser emission time caused by the variation in characteristic such as the laser rise time or fall time for image data can be suppressed by correcting the timing of the laser ON/OFF signal without any influence of the image pattern transfer accuracy or swing of the transfer belt. Hence, the dot size or dot formation position in image formation can be stabilized.

Third Embodiment

The object of the present invention can also be achieved by supplying a storage medium which records software program codes for implementing the functions of the above-described embodiments to an image formation apparatus and causing the computer (or CPU or MPU) of the apparatus to read out and execute the program codes stored in the storage medium. The program codes need not always be stored in a client computer and can also be stored in, e.g., a computer functioning as a server.

In this case, the program codes read out from the storage medium implement the functions of the above-described embodiments by themselves, and the storage medium which stores the program codes constitutes the present invention.

As the storage medium to supply the program codes, for example, a flexible disk, hard disk, optical disk, magnetooptical disk, CD-ROM, CD-R, DVD, magnetic tape, nonvolatile memory card, ROM, or the like can be used.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

By the program provided by the embodiments and the computer-readable storage medium which stores the program, image formation processing can be executed in which the variation in laser emission time caused by the variation in characteristic such as the laser rise time or fall time for image data can be suppressed by correcting the timing of the laser ON/OFF signal, and the dot size or dot formation position in image formation can be stabilized.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-347240 filed on Nov. 30, 2004, which is hereby incorporated by reference herein.

What is claimed is:

1. An image formation apparatus which causes a laser source to irradiate laser light based on input image data, forms an electrostatic latent image on a photosensitive member by exposing the photosensitive member with the laser light, and forms an image by developing the electrostatic latent image, said image formation apparatus comprising:

a control unit adapted to:

(a) calculate, based on the input image data, a pre-correction continuous OFF time of the laser source between a preceding pixel and a subsequent pixel in the input image data, the input image data indicating that the preceding pixel is a last pixel to be formed by the laser source before the laser source is to form the subsequent pixel, and the pre-correction continuous OFF time beginning when the laser source is to switch from ON to OFF according to the input image data to conclude formation of the preceding pixel and ending at an initial ON time that occurs when the laser source is to switch from OFF to ON to form the subsequent pixel according to the input image data, and (b) correct the initial ON time by shifting the initial ON time earlier by an amount proportional to a duration of the calculated pre-correction continuous OFF time, wherein the control unit is adapted to generate corrected image data from the input image data at least by performing (a) and (b) for multiple pixel pairs in the input image data, the corrected image data including multiple of the corrected initial ON times respectively corresponding to the multiple pixel pairs.

2. The apparatus according to claim 1, further comprising a storage unit adapted to make ON timing data for turning on the laser source correspond to a plurality of continuous OFF times of the laser source, and to store the ON timing data, wherein the control unit is adapted to read out the ON timing data from the storage unit and causes the laser source to turn on based on the input image data and the ON timing data read out from the storage unit.

3. The apparatus according to claim 2, further comprising a first reading unit adapted to read a test pattern formed on the photosensitive member, wherein the control unit is adapted to form the test pattern on the photosensitive member and generates the ON timing data based on a reading result of the test pattern read by the first reading unit.

4. The apparatus according to claim 3, wherein the control unit is adapted to form the test pattern including a plurality of pattern images corresponding to each of the plurality of continuous OFF times, each of the plurality of pattern images being formed by turning on the laser source at a predetermined timing after a laser OFF time has been set, and wherein the control unit is adapted to generate the ON timing data based on a reading result of the test pattern read by the first reading unit.

5. The apparatus according to claim 2, further comprising:

an intermediate transferring member on which the electrostatic latent image formed on the photosensitive member is transferred;

a second reading unit adapted to read a test pattern transferred on the intermediate transferring member, wherein the control unit is adapted to form the test pattern on the intermediate transferring member and to generate the ON timing data based on a reading result of the test pattern read by the second reading unit.

6. The apparatus according to claim 5, wherein the control unit is adapted to form the test pattern including a plurality of pattern images corresponding to each of the plurality of continuous OFF times, each of the plurality of pattern images being formed by turning on the laser source at a predetermined timing after a laser OFF time has been set, and wherein the control unit is adapted to generate the ON timing data corresponding to the plurality of continuous OFF times based on a reading result of the test pattern read by the second reading unit.

7. An image formation apparatus which causes a laser source to irradiate laser light based on input image data, forms an electrostatic latent image on a photosensitive member by exposing the photosensitive member with the laser light, and forms an image by developing the electrostatic latent image, said image formation apparatus comprising:

a control unit adapted to:

(a) calculate, based on the input image data, a pre-correction continuous ON time of the laser source between a preceding portion and a subsequent portion in the image data, the input image data indicating that the preceding portion is a last pixel having no image spot formed by the laser source before the laser source does not form an image spot for the subsequent portion, and the pre-correction continuous ON time beginning when the laser source is to switch from OFF to ON according to the input image data to conclude non-formation of an image spot for the preceding portion and ending at an initial OFF time that occurs when the laser source is to switch from ON to OFF to not form an image spot for the subsequent portion according to the input image data, and (b) correct the initial OFF time by shifting the initial OFF time earlier by an amount proportional to a duration of the calculated pre-correction continuous ON time, wherein the control unit is adapted to generate corrected image data from the input image data at least by performing (a) and (b) for multiple portion pairs in the input image data, the corrected image data including multiple of the corrected initial OFF times respectively corresponding to the multiple portion pairs.

8. The apparatus according to claim 7, further comprising a storage unit adapted to make OFF timing data for turning off the laser source correspond to a plurality of continuous ON times of the laser source, and to store the OFF timing data, wherein the control unit is adapted to read out the OFF timing data from the storage unit and causes the laser source to turn off based on the input image data and the OFF timing data read out from the storage unit.

9. The apparatus according to claim 8, further comprising a first reading unit adapted to read a test pattern formed on the photosensitive member, wherein the control unit is adapted to form the test pattern on the photosensitive member and generates the OFF timing data based on a reading result of the test pattern read by the first reading unit.

10. The apparatus according to claim 9, wherein the control unit is adapted to form the test pattern including a plurality of pattern images corresponding to each of the plurality of continuous ON times, each of the plurality of pattern images being formed by turning off the laser source at a predetermined timing after a laser ON time has been set, and wherein the control unit is adapted to generate the OFF timing data based on a reading result of the test pattern read by the first reading unit.

11. The apparatus according to claim 8, further comprising:

an intermediate transferring member on which the electrostatic latent image formed on the photosensitive member is transferred;

a second reading unit adapted to read a test pattern transferred on the intermediate transferring member, wherein the control unit is adapted to form the test pattern on the intermediate transferring member and to generate the OFF timing data based on a reading result of the test pattern read by the second reading unit.

12. The apparatus according to claim 5, wherein the control unit is adapted to form the test pattern including a plurality of pattern images corresponding to each of the plurality of continuous ON times, each of the plurality of pattern images being formed by turning off the laser source at a predetermined timing after a laser ON time has been set, and
wherein the control unit is adapted to generate the OFF timing data corresponding to the plurality of continuous ON times based on a reading result of the test pattern read by the second reading unit.

* * * * *